United States Patent
Propheter-Hinckley

(10) Patent No.: US 10,731,495 B2
(45) Date of Patent: *Aug. 4, 2020

(54) AIRFOIL WITH PANEL HAVING PERIMETER SEAL

(71) Applicant: United Technologies Corporation, Farmington, CT (US)

(72) Inventor: Tracy A. Propheter-Hinckley, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 413 days.

This patent is subject to a terminal disclaimer.

(21) Appl. No.: 15/354,243

(22) Filed: Nov. 17, 2016

(65) Prior Publication Data

US 2018/0135452 A1 May 17, 2018

(51) Int. Cl.
| | |
|---|---|
| *F01D 11/00* | (2006.01) |
| *F01D 5/12* | (2006.01) |
| *F01D 9/02* | (2006.01) |
| *F04D 29/32* | (2006.01) |
| *F04D 29/54* | (2006.01) |
| *F04D 29/08* | (2006.01) |

(Continued)

(52) U.S. Cl.
CPC ............ *F01D 11/005* (2013.01); *F01D 5/005* (2013.01); *F01D 5/12* (2013.01); *F01D 5/147* (2013.01); *F01D 5/18* (2013.01); *F01D 9/02* (2013.01); *F02C 3/04* (2013.01); *F04D 29/083* (2013.01); *F04D 29/324* (2013.01); *F04D 29/542* (2013.01); *F04D 29/584* (2013.01); *F05D 2220/32* (2013.01); *F05D 2240/57* (2013.01); *F05D 2300/20* (2013.01); *Y02T 50/672* (2013.01); *Y02T 50/676* (2013.01)

(58) Field of Classification Search
CPC .......... F01D 11/005; F01D 9/02; F01D 5/147; F01D 5/18; F05D 2240/57
USPC ....... 415/5, 115, 139; 277/167.5; 416/223 R, 416/232
See application file for complete search history.

(56) References Cited

U.S. PATENT DOCUMENTS

| | | |
|---|---|---|
| 3,215,511 A | 11/1965 | Chisholm |
| 4,137,008 A | 1/1979 | Grant et al. |

(Continued)

FOREIGN PATENT DOCUMENTS

| | | |
|---|---|---|
| EP | 0764764 | 3/1997 |
| EP | 1764481 | 3/2007 |

(Continued)

OTHER PUBLICATIONS

English language translation; Tellier, Florian; AUBE COMPOSEE D'UN CORPS CREUX ET D'UN COUVERCLE COLLE SUR UNE OUVERTURE DU CORPS, FR3025552 (A1); (Year: 2016).*

(Continued)

*Primary Examiner* — Kenneth Bomberg
*Assistant Examiner* — Hakeem M Abdellaoui
(74) *Attorney, Agent, or Firm* — Carlson, Gaskey & Olds, P.C.

(57) ABSTRACT

An airfoil includes an airfoil structure that defines a portion of an airfoil profile and a panel that defines a different portion of the airfoil profile. The panel has perimeter edges that meet the airfoil structure in a perimeter joint, and there is a perimeter seal disposed in the perimeter joint.

13 Claims, 6 Drawing Sheets

(51) Int. Cl.
| | | |
|---|---|---|
| *F02C 3/04* | (2006.01) | |
| *F01D 5/00* | (2006.01) | |
| *F01D 5/14* | (2006.01) | |
| *F04D 29/28* | (2006.01) | |
| *F01D 5/18* | (2006.01) | |
| *F04D 29/58* | (2006.01) | |

(56) References Cited

U.S. PATENT DOCUMENTS

| | | | |
|---|---|---|---|
| 4,247,259 A | 1/1981 | Saboe et al. | |
| 4,396,349 A | 8/1983 | Hueber | |
| 4,914,794 A | 4/1990 | Strangman | |
| 5,358,379 A | 10/1994 | Pepperman et al. | |
| 5,522,705 A | 6/1996 | Elaini et al. | |
| 5,531,457 A * | 7/1996 | Tibbott | F01D 11/006 |
| | | | 277/590 |
| 5,538,380 A | 7/1996 | Norton et al. | |
| 5,681,616 A | 10/1997 | Gupta et al. | |
| 5,705,231 A | 1/1998 | Nissley et al. | |
| 5,827,045 A * | 10/1998 | Beeck | F01D 5/284 |
| | | | 416/96 A |
| 5,951,892 A | 9/1999 | Wolfla et al. | |
| 6,000,906 A | 12/1999 | Draskovich | |
| 6,102,656 A | 8/2000 | Nissley et al. | |
| 6,224,963 B1 | 5/2001 | Strangman | |
| 6,316,078 B1 | 11/2001 | Smialek | |
| 6,503,051 B2 * | 1/2003 | Predmore | F01D 11/005 |
| | | | 277/312 |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,648,597 B1 * | 11/2003 | Widrig | C04B 37/001 |
| | | | 415/200 |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,736,131 B1 * | 6/2010 | Wilson, Jr. | B82Y 30/00 |
| | | | 416/226 |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,430,626 B1 * | 4/2013 | Liang | F01D 5/22 |
| | | | 277/412 |
| 8,480,366 B2 | 7/2013 | Malecki et al. | |
| 8,506,243 B2 | 8/2013 | Strock et al. | |
| 8,727,710 B2 * | 5/2014 | Propheter-Hinckley | F01D 11/005 |
| | | | 415/139 |
| 8,821,124 B2 | 9/2014 | Viens et al. | |

| | | | |
|---|---|---|---|
| 2001/0033793 A1 * | 10/2001 | Lewis | F01D 5/147 |
| | | | 416/232 |
| 2002/0187040 A1 | 12/2002 | Predmore | |
| 2004/0013522 A1 * | 1/2004 | Burdgick | F01D 11/003 |
| | | | 415/230 |
| 2006/0226290 A1 * | 10/2006 | Campbell | F01D 5/146 |
| | | | 244/123.1 |
| 2006/0228211 A1 * | 10/2006 | Vance | F01D 5/14 |
| | | | 415/200 |
| 2008/0025846 A1 * | 1/2008 | Vance | F01D 5/147 |
| | | | 416/233 |
| 2008/0159850 A1 | 7/2008 | Tholen et al. | |
| 2009/0193657 A1 * | 8/2009 | Wilson, Jr. | F01D 5/147 |
| | | | 29/889.721 |
| 2010/0136258 A1 | 6/2010 | Strock et al. | |
| 2011/0058953 A1 * | 3/2011 | Simon-Delgado | F01D 5/147 |
| | | | 416/241 R |
| 2011/0142668 A1 * | 6/2011 | Rao | F03D 1/0675 |
| | | | 416/229 R |
| 2014/0193250 A1 * | 7/2014 | Papin | F01D 5/147 |
| | | | 415/208.1 |
| 2015/0016971 A1 * | 1/2015 | Freeman | F01D 5/147 |
| | | | 415/175 |
| 2016/0076390 A1 * | 3/2016 | Marmilic | F01D 5/14 |
| | | | 415/116 |
| 2016/0090851 A1 | 3/2016 | Carr et al. | |
| 2016/0177757 A1 * | 6/2016 | Sarawate | F01D 11/005 |
| | | | 415/1 |
| 2016/0215627 A1 * | 7/2016 | Roberge | F01D 5/147 |
| 2016/0326892 A1 * | 11/2016 | Cook, III | F01D 5/284 |
| 2017/0175534 A1 * | 6/2017 | Ferber | F01D 5/147 |
| 2018/0106158 A1 * | 4/2018 | Boeke | F01D 9/041 |
| 2018/0135451 A1 * | 5/2018 | Propheter-Hinckley | |
| | | | F01D 11/005 |
| 2018/0135453 A1 * | 5/2018 | Propheter-Hinckley | |
| | | | F01D 5/12 |

FOREIGN PATENT DOCUMENTS

| | | |
|---|---|---|
| EP | 1882814 | 1/2008 |
| EP | 2105579 | 9/2009 |
| EP | 2738356 | 6/2014 |
| EP | 2772614 | 9/2014 |
| EP | 2853688 | 4/2015 |
| FR | 3025552 | 3/2016 |
| GB | 2272453 | 5/1994 |
| JP | 61066802 | 4/1986 |
| JP | 05321602 | 12/1993 |
| WO | 2013011235 | 1/2013 |
| WO | 2014051670 | 4/2014 |
| WO | 2015116347 | 8/2015 |

OTHER PUBLICATIONS

European Search Report for European Patent Application No. 17202402 completed Mar. 19, 2018.
European Search Report for European Patent Application No. 17202442 completed Mar. 15, 2018.
U.S. Appl. No. 13/429,474, filed Mar. 26, 2012.
U.S. Appl. No. 14/659,718, filed Mar. 17, 2015.
U.S. Appl. No. 14/812,668, filed Jul. 29, 2015.

* cited by examiner

AIRFOIL WITH PANEL HAVING PERIMETER SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil structure that defines a portion of an airfoil profile. A panel defines a different portion of the airfoil profile. The panel has perimeter edges that meet the airfoil structure in a perimeter joint. A perimeter seal is disposed in the perimeter joint.

In a further embodiment of any of the foregoing embodiments, the perimeter seal is a feather seal.

In a further embodiment of any of the foregoing embodiments, the feather seal includes at least two feather seal pieces.

In a further embodiment of any of the foregoing embodiments, the feather seal includes a U-shaped feather seal piece.

In a further embodiment of any of the foregoing embodiments, the panel includes a first slot in the perimeter edges and the airfoil structure includes a second slot. The first slot and the second slot together define a seal slot, and perimeter seal is disposed in the seal slot.

In a further embodiment of any of the foregoing embodiments, the first slot includes an axial slot portion and a radial slot portion extending from the axial slot portion.

In a further embodiment of any of the foregoing embodiments, the perimeter seal is annular and circumscribes the panel.

In a further embodiment of any of the foregoing embodiments, the panel defines a pressure side of the airfoil profile.

In a further embodiment of any of the foregoing embodiments, the airfoil structure includes an internal cavity, and the panel bounds a side of the internal cavity.

In a further embodiment of any of the foregoing embodiments, the panel includes ceramic.

In a further embodiment of any of the foregoing embodiments, the panel includes a perimeter bearing surface and the airfoil structure includes a bearing surface in contact with the perimeter bearing surface in the joint.

A gas turbine engine according to an example of the present disclosure includes a compressor section, a combustor in fluid communication with the compressor section, and a turbine section in fluid communication with the combustor. One of the turbine section or the compressor section includes an airfoil that has an airfoil structure that defines a portion of an airfoil profile. A panel defines a different portion of the airfoil profile. The panel has perimeter edges that meet the airfoil structure in a perimeter joint. A perimeter seal is disposed in the perimeter joint.

In a further embodiment of any of the foregoing embodiments, the panel includes a first slot in the perimeter edges and the airfoil structure includes a second slot. The first slot and the second slot together define a seal slot, and the perimeter seal is disposed in the seal slot.

In a further embodiment of any of the foregoing embodiments, the first slot includes an axial slot portion and a radial slot portion extending from the axial slot portion.

In a further embodiment of any of the foregoing embodiments, the perimeter seal is a feather seal.

In a further embodiment of any of the foregoing embodiments, the perimeter seal is annular and circumscribes the panel.

An article according to an example of the present disclosure includes a panel that defines a portion of an airfoil profile. The panel has perimeter edges and a perimeter slot in the perimeter edges. The perimeter slot is configured to receive a perimeter seal.

A further embodiment of any of the foregoing embodiments includes the perimeter seal partially disposed in the perimeter slot.

In a further embodiment of any of the foregoing embodiments, the panel includes a ceramic.

In a further embodiment of any of the foregoing embodiments, the perimeter slot includes an axial slot portion and a radial slot portion extending from the axial slot portion.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
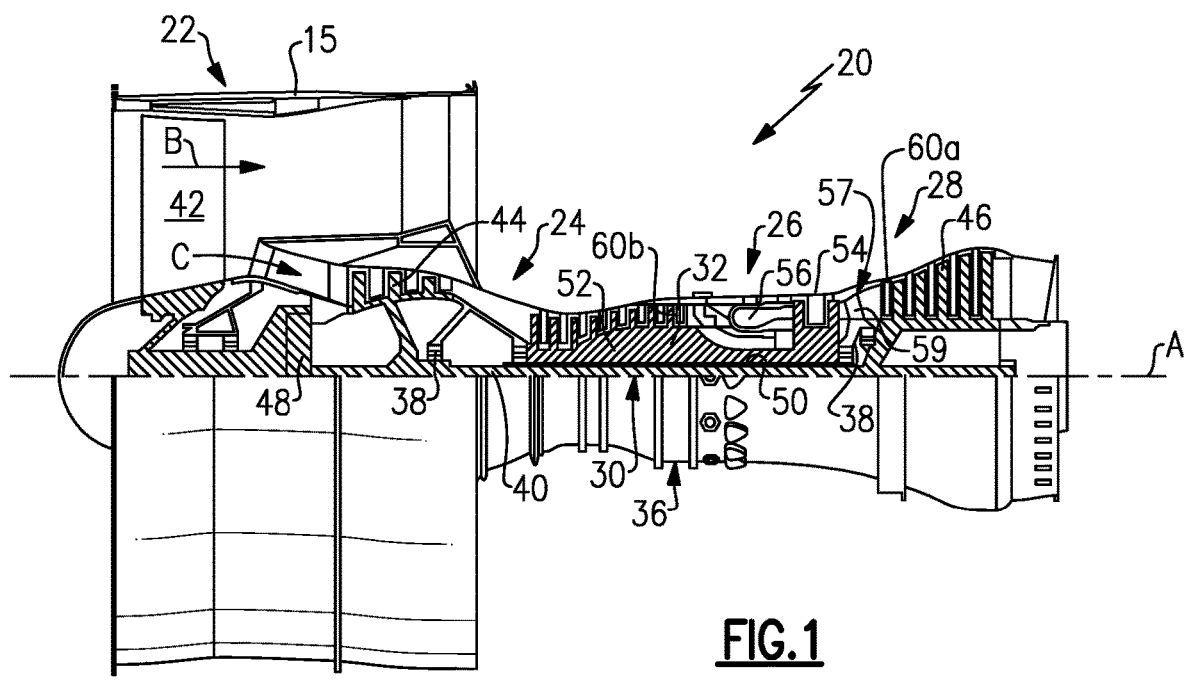
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2A:
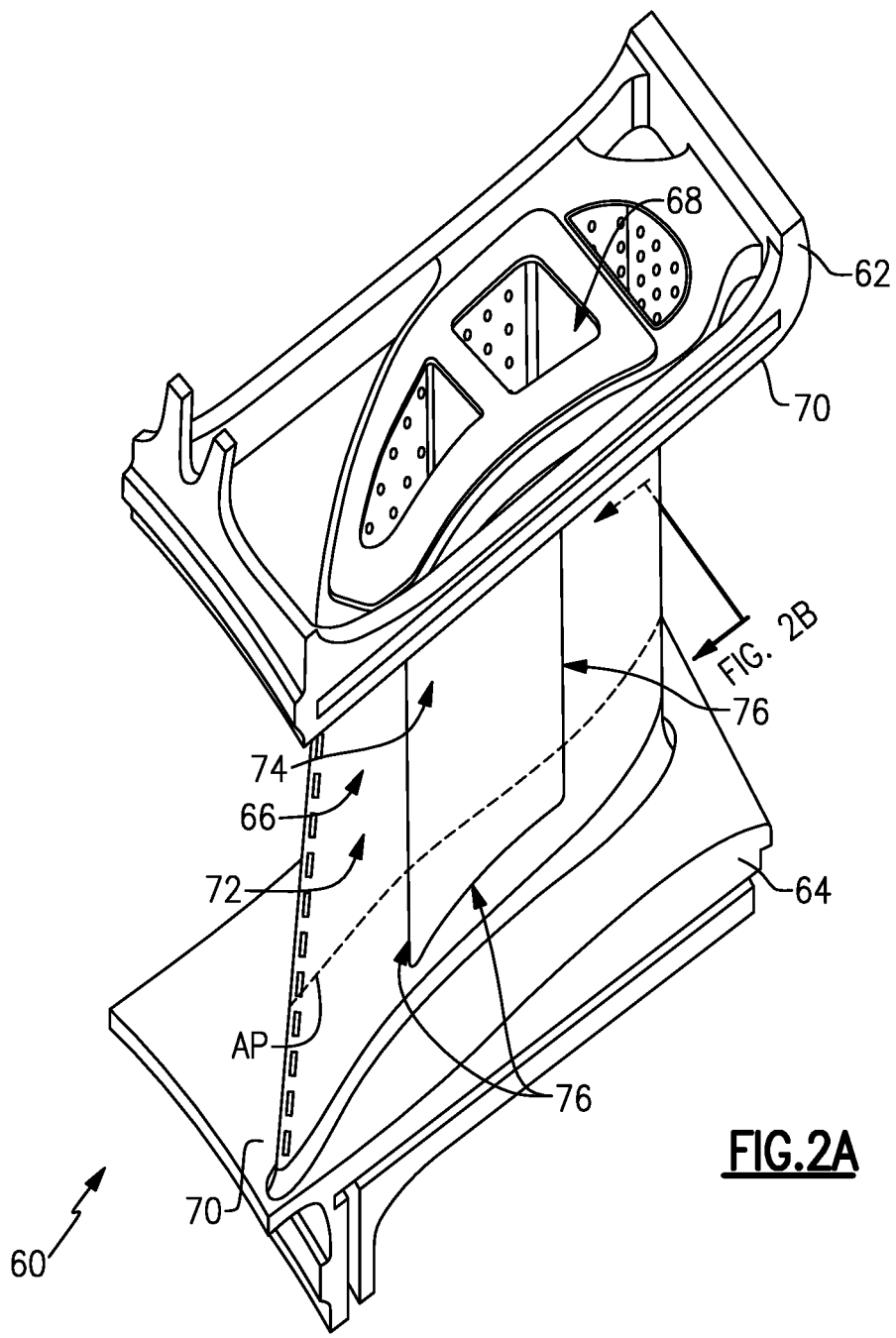
FIG. 2A illustrates an example airfoil of the engine of FIG. 1.
Figure 2B:
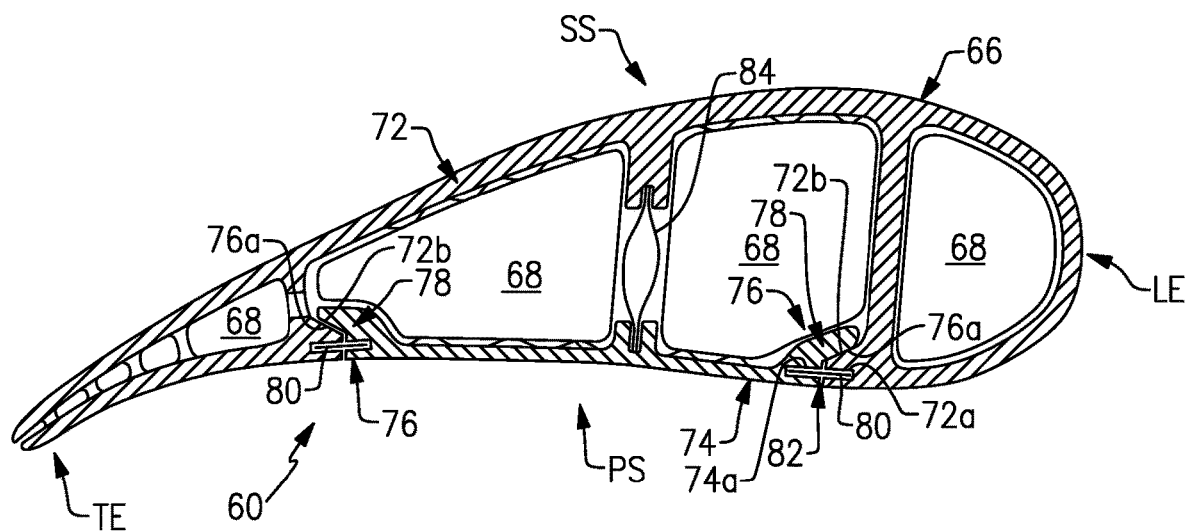
FIG. 2B illustrates a sectioned view of the airfoil of FIG. 2A.
Figure 2C:
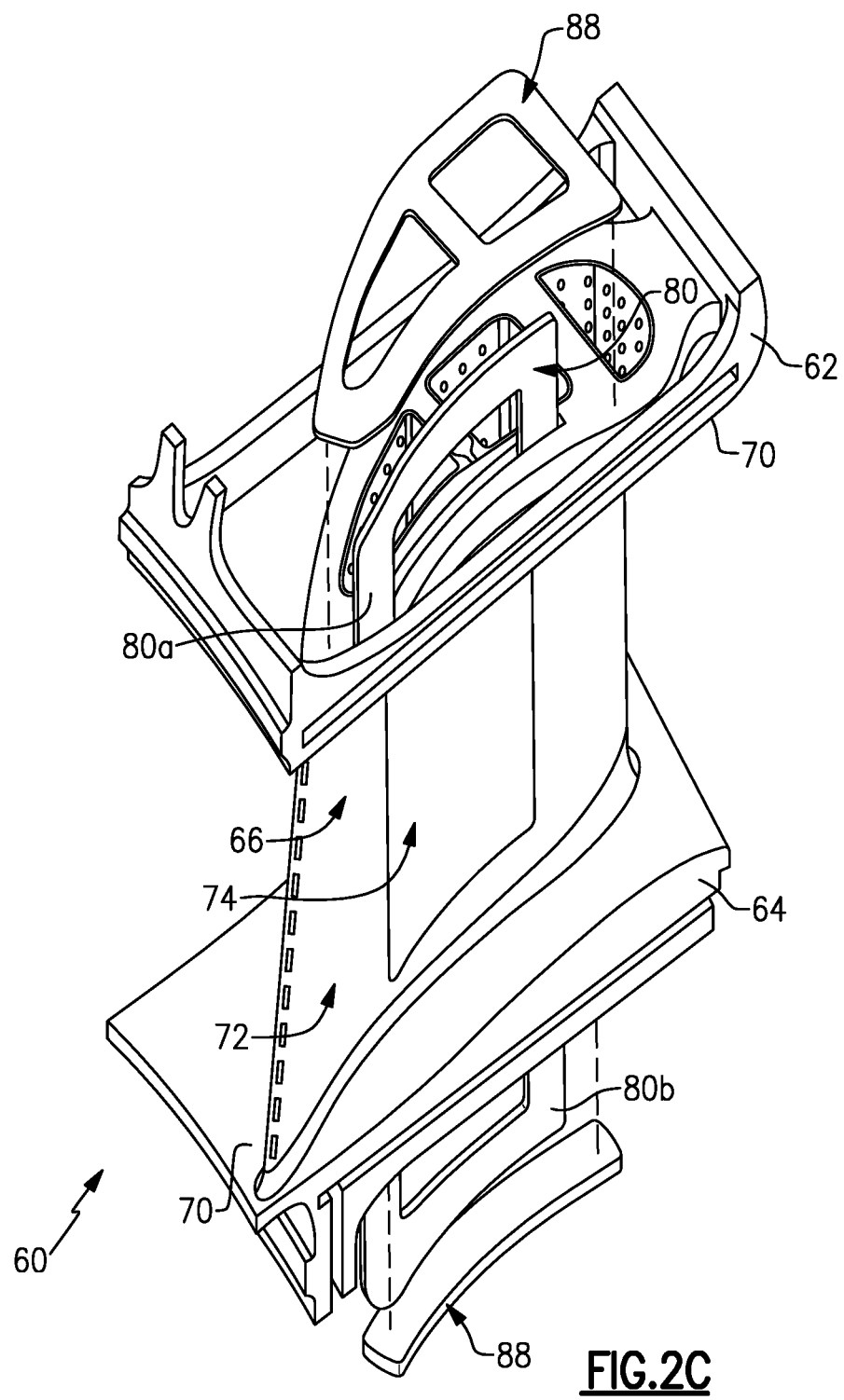
FIG. 2C illustrates an expanded view of the airfoil of FIG. 2A.
Figure 2D:
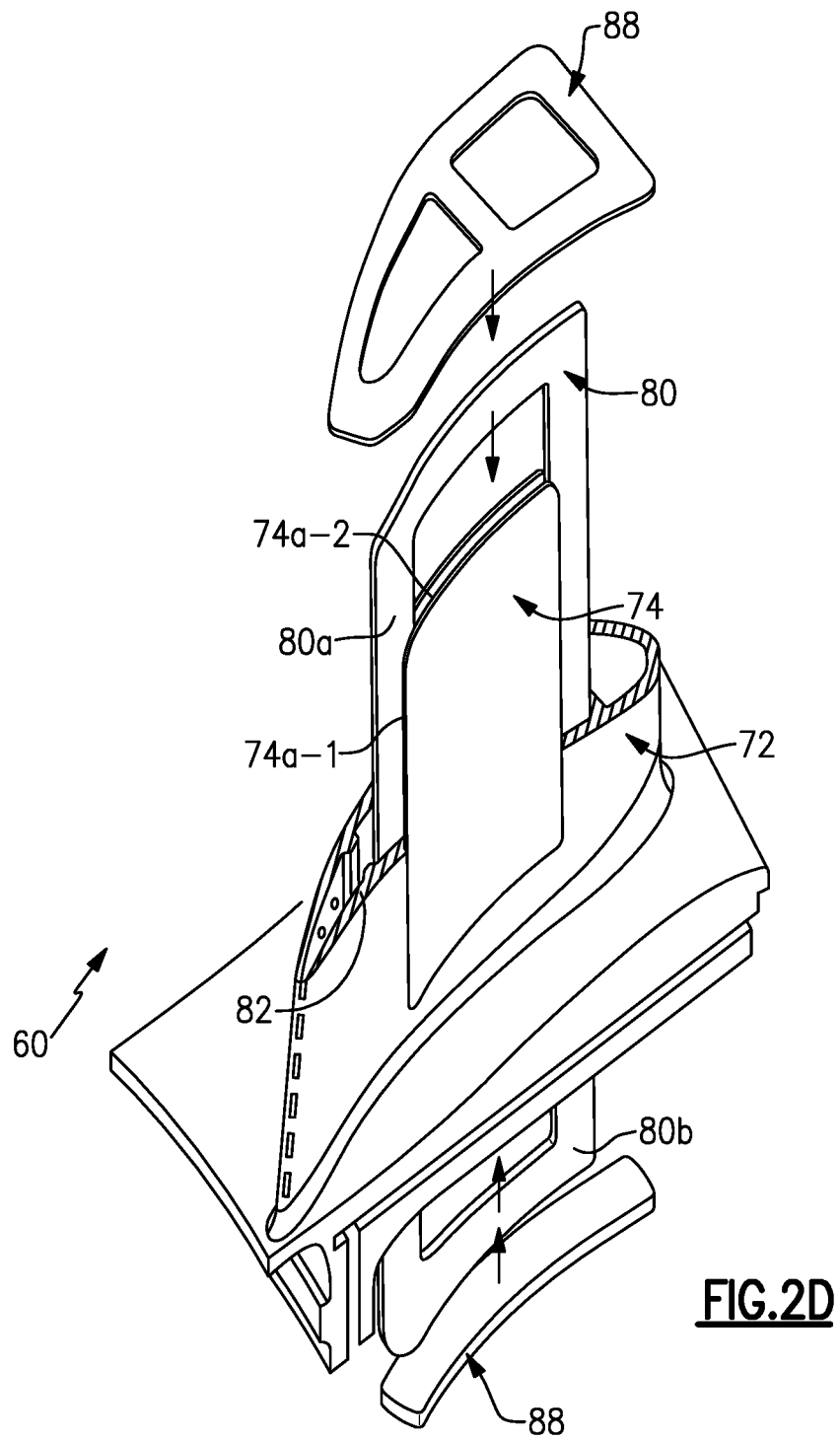
FIG. 2D illustrates an expanded view of the airfoil of FIG. 2A, with a portion of the airfoil cut away.

FIGS. 2A, 2B, 2C, and 2D illustrate different views of an example airfoil 60 used in the engine 20. FIG. 2A is an isolated view; FIG. 2B is a sectioned view; FIG. 2C is an expanded view; and FIG. 2D is an expanded view with portions of the airfoil 60 cut away. For instance, the airfoil 60 can be a turbine vane, as represented at 60a in FIG. 1, or a compressor vane, as represented at 60b in FIG. 1. In this example, the airfoil 60 is a static vane. As will be appreciated, although the examples herein are described in the context of a vane, this disclosure is not limited to vanes, and the examples may also be applicable to blades or other airfoils that are exposed to high temperatures.

The airfoil 60 includes a first or outer end section 62, a second or inner end section 64, and an airfoil section 66 that spans in a longitudinal direction between the first and second end sections 62/64. The longitudinal direction is also the radial direction in the engine 20 with regard to the engine central axis A. The airfoil section 66 defines an airfoil profile (AP), which is the peripheral shape of the airfoil section 66 when viewed in a radial direction. For example, the airfoil profile (AP) has a wing-like shape that provides a reaction force via Bernoulli's principle with regard to flow over the airfoil section 66. The full or complete airfoil profile (AP) generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

The airfoil section 66 may be hollow and include one or more internal cavities 68. The internal cavity or cavities 68 may be provided with cooling bleed air from the compressor section 24 of the engine 20, to cool the airfoil 60. In this example of a static vane, and the end sections 62/64 include respective platforms 70. Together, the platforms 70 provide the inner and outer bounds of the core gas path.

The airfoil section 66 is formed of an airfoil structure 72 and a panel 74 that is attached with the airfoil structure 72. In this example, the airfoil structure 72 defines the leading end (LE), the suction side (SS), and the trailing end (TE) of the airfoil profile (AP) and the panel 74 defines the pressure side (PS), or at least a portion thereof. As will be appreciated, although the illustrated example includes only one panel 74, the airfoil section 66 could include additional panels.

Referring to FIG. 2B, the panel 74 has perimeter edges 76. The perimeter edges 76 are the edge regions of the panel 74, not just the terminal faces of the panel 74. The perimeter edges 76 meet the airfoil structure 72 in a perimeter joint 78. A perimeter seal 80 is disposed in the perimeter joint 78.

In this example, the panel 74 includes a first slot 74a in the perimeter edges 76. In the illustrated example, the first slot 74a extends all the way around the panel 74. The first slot 74a thus includes one or more axial slot portions 74a-1 (FIG. 2D) and one or more radial slot portions 74a-2 that extend from the axial slot portion 74a-1. In a rectangular panel, there would be two opposed axial slot portions connected by two opposed radial slot portions.

Figure 2E:
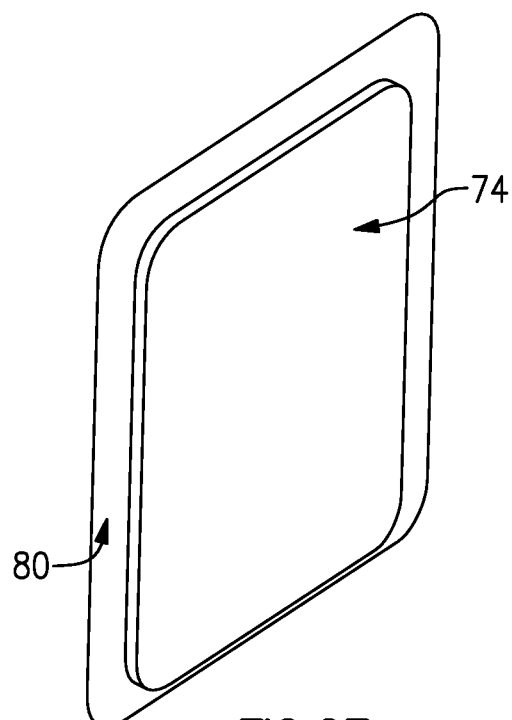
FIG. 2E illustrates a panel of the airfoil if FIG. 2A with a perimeter seal.

The airfoil structure 72 is formed of a wall that has a second slot 72a. The slots 72a/74a align and together define a perimeter seal slot 82. The perimeter seal 80 is disposed in the perimeter seal slot 82. For example, the perimeter seal 80 is an annular feather seal that circumscribes the panel 74, as shown in FIG. 2E. The feather seal may be a relatively thin, flat sheet of metal and may be flexible.

The perimeter seal 80 serves as a type of labyrinth seal to block gas from leaking around the panel 74. For instance, the panel 74 bounds one or more of the internal cavities in the airfoil structure 72. Cooling bleed air in the cavities 68 is typically provided at a higher pressure that the pressure external of the airfoil section 66. The perimeter seal 80 thus serves to facilitate reduction in undesired escape of the bleed air around the panel 74. For example, the pressure differential across the perimeter seal 80 urges the perimeter seal 80 against the sides of the perimeter seal slot 82, in essence conforming the perimeter seal 80 to the sides. The conformance, in turn, blocks bleed air from passing by the perimeter seal 80 and escaping into the core gas path.

The panel 74 also includes joint features to facilitate proper positioning with respect to the airfoil structure 72. For instance, the perimeter edges 76 of the panel 74 include a perimeter bearing surface 76a. The airfoil structure 72 includes a bearing surface 72b that contacts the perimeter bearing surface 76a in the joint 78. The bearing surfaces 76a/72b are sloped and thus serve as a self-centering feature for properly positioning the panel 74 and facilitate alignment of the slots 72a/74a. In this example, the airfoil section 66 further includes a spring rib 84 that biases the perimeter bearing surface 76a into the bearing surface 72b of the airfoil structure 72.

FIGS. 2C and 2D also demonstrate assembly of the perimeter seal 80 into the airfoil section 66. For example, the perimeter seal 80 includes a first feather seal piece 80a and a second feather seal piece 80b. Each feather seal piece 80a/80b is U-shaped. After attachment of the panel 74 into the airfoil section 66, the legs of the U-shape of the first feather seal piece 80a are inserted through the outer end section 62 into the seal slot 82. The legs of the U-shape of the second feather seal piece 80b are inserted through the inner end section 64 into the seal slot 82. Once fully installed, the tips of the legs of the seal pieces 80a/80b may either abut or overlap. Covers 88 are then secured on the end sections 62/64. The covers 88 thus retain the seal pieces 80a/80b in the seal slot 82.

Figure 3:
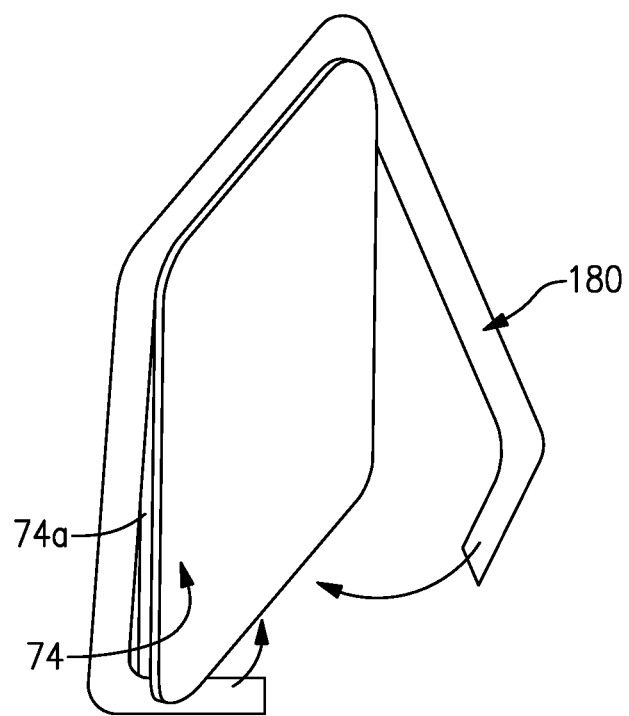
FIG. 3 illustrates another example of a perimeter seal.

FIG. 3 illustrates another example of a perimeter seal 180. In this example, rather than multiple seal pieces, the perimeter seal 180 is a one-piece split ring seal. The seal 180 is installed around the panel 72 into the perimeter slot 74a. For example, the seal 180 is bent to conform to the geometry of the panel 74. The panel 74 with installed seal 180 is then installed though one of the end sections 62/64 into the airfoil structure 72 by sliding the seal 180 into the slots 80.

Should the panel 74 require replacement, the airfoil 60 can be disassembled, the panel 74 can be replaced with a new one, and the airfoil 60 can be reassembled. Accordingly, the panel 74 can be produced individually as a new article for original airfoils 60 or as an individual replacement article for an existing airfoil.

The materials of which the airfoil 60 is formed of may be selected to enhance the performance. For example, the airfoil structure 72 and the panel 74 may be formed of a ceramic or of a metal. For instance, the panel 74 is ceramic and the airfoil structure 72 is metal. Metal alloys provide a good combination of strength and durability. Example alloys may include, but are not limited to, nickel alloys, cobalt alloys, a nickel alloy coated with cobalt or cobalt alloy, or non-nickel alloys that do not substantially react with ceramic. Ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

If enhanced thermal or environmental resistance is desired, the airfoil structure 72 and/or the panel 74 may be coated with a thermal and/or environmental barrier ceramic coating, including but not limited to segmented coatings. As an example, the ceramic may include or may be oxides, carbides, nitrides, borides, silicides, or combinations thereof. In further examples, the ceramic may be or may include yttria stabilized with zirconia, hafnia, and/or gadolinia, gadolinia zirconate, molybdate, alumina, or combinations thereof.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil structure defining a portion of an airfoil profile;
   a panel defining a different portion of the airfoil profile, the panel having perimeter edges meeting the airfoil structure in a perimeter joint, the panel including a perimeter bearing surface and the airfoil structure including a bearing surface in contact with the perimeter bearing surface in the perimeter joint, the airfoil structure including an internal cavity and a spring rib in the internal cavity, the spring rib biasing the perimeter bearing surface of the panel against the bearing surface of the airfoil structure; and
   a perimeter seal disposed in the perimeter joint, wherein the perimeter seal is a feather seal that is a sheet of metal.

2. The airfoil as recited in claim 1, wherein the feather seal includes at least two feather seal pieces.

3. The airfoil as recited in claim 1, wherein the feather seal includes a U-shaped feather seal piece.

4. The airfoil as recited in claim 1, wherein the panel includes a first slot in the perimeter edges and the airfoil structure includes a second slot, the first slot and the second slot together defining a seal slot, and the feather seal is disposed in the seal slot.

5. The airfoil as recited in claim 4, wherein the first slot includes an axial slot portion and a radial slot portion extending from the axial slot portion.

6. The airfoil as recited in claim 4, wherein the feather seal is annular and circumscribes the panel.

7. The airfoil as recited in claim 1, wherein the panel defines a pressure side of the airfoil profile.

8. The airfoil as recited in claim 1, wherein the panel includes ceramic.

9. The airfoil as recited in claim 1, wherein there is a pressure differential across the feather seal urging the feather seal outwards against the sides of a perimeter seal slot.

10. A gas turbine engine comprising:
    a compressor section;
    a combustor in fluid communication with the compressor section; and
    a turbine section in fluid communication with the combustor,
    at least one of the turbine section or the compressor section including an airfoil having
      an airfoil structure defining a portion of an airfoil profile,
      a panel defining a different portion of the airfoil profile, the panel having perimeter edges meeting the airfoil structure in a perimeter joint, the panel including a perimeter bearing surface and the airfoil structure including a bearing surface in contact with the perimeter bearing surface in the perimeter joint, the airfoil structure including an internal cavity and a spring rib in the internal cavity, the spring rib biasing the perimeter bearing surface of the panel against the bearing surface of the airfoil structure, and
      a perimeter seal disposed in the perimeter joint, wherein the perimeter seal is a feather seal that is a sheet of metal.

11. The gas turbine engine as recited in claim 10, wherein the panel includes a first slot in the perimeter edges and the airfoil structure includes a second slot, the first slot and the second slot together defining a seal slot, and the feather seal is disposed in the seal slot.

12. The gas turbine engine as recited in claim 11, wherein the first slot includes an axial slot portion and a radial slot portion extending from the axial slot portion.

13. The gas turbine engine as recited in claim 12, wherein the feather seal is annular and circumscribes the panel.

\* \* \* \* \*